(12) United States Patent
Sheridan

(10) Patent No.: US 12,259,036 B2
(45) Date of Patent: Mar. 25, 2025

(54) ELECTRIC MOTOR DRIVEN AUXILIARY OIL SYSTEM FOR GEARED GAS TURBINE ENGINE

(71) Applicant: United Technologies Corporation, Farmington, CT (US)

(72) Inventor: William G. Sheridan, Southington, CT (US)

(73) Assignee: RTX Corporation, Farmington, CT (US)

(*) Notice: Subject to any disclaimer, the term of this patent is extended or adjusted under 35 U.S.C. 154(b) by 1569 days.

(21) Appl. No.: 15/958,718

(22) Filed: Apr. 20, 2018

(65) Prior Publication Data

US 2019/0323597 A1 Oct. 24, 2019

(51) Int. Cl.
*F16H 57/04* (2010.01)
*F01D 25/20* (2006.01)
(Continued)

(52) U.S. Cl.
CPC ......... *F16H 57/0442* (2013.01); *F01D 25/20* (2013.01); *F02C 7/06* (2013.01);
(Continued)

(58) Field of Classification Search
CPC .......... F01D 25/20; F01D 19/00; F01D 25/18; F01D 21/14; F02C 7/36; F02C 7/06;
(Continued)

(56) References Cited

U.S. PATENT DOCUMENTS

| 4,478,082 A | * | 10/1984 | Sato | ........................ G01H 1/003 |
| | | | | 73/593 |
| 5,315,821 A | * | 5/1994 | Dunbar | ..................... F02K 1/70 |
| | | | | 244/110 B |

(Continued)

FOREIGN PATENT DOCUMENTS

| EP | 2832976 A1 | 2/2015 |
| EP | 3159500 A1 | 4/2017 |

(Continued)

OTHER PUBLICATIONS

European Search Report for EP Application No. 19169100.5 dated Aug. 8, 2019.

(Continued)

*Primary Examiner* — Christopher R Legendre
(74) *Attorney, Agent, or Firm* — Carlson, Gaskey & Olds, P.C.

(57) ABSTRACT

A gas turbine engine includes a fan drive turbine, a fan rotor, and a gear reduction driven by the fan drive turbine and, in turn, to drive the fan rotor. A main oil supply system supplies oil to components within the gear reduction, and an auxiliary oil supply system. The auxiliary oil supply system includes a rotation sensor for sensing rotation of a component that will rotate with the fan rotor, a control, an auxiliary oil pump, and a main supply sensor for sensing operation of the main oil supply system. The control is programmed to supply oil from the auxiliary oil pump to the gear reduction when the rotation sensor senses the component is rotating. A determination is made that inadequate oil is being supplied (Continued)

from the main oil supply system based upon information from the main supply sensor.

2 Claims, 2 Drawing Sheets

(51) Int. Cl.
*F02C 7/06* (2006.01)
*F02C 7/36* (2006.01)

(52) U.S. Cl.
CPC .............. *F02C 7/36* (2013.01); *F16H 57/042* (2013.01); *F16H 57/0435* (2013.01); *F16H 57/0439* (2013.01); *F16H 57/045* (2013.01); *F16H 57/0471* (2013.01); *F16H 57/0482* (2013.01); *F05D 2220/323* (2013.01); *F05D 2260/40311* (2013.01); *F05D 2260/84* (2013.01); *F05D 2260/98* (2013.01)

(58) Field of Classification Search
CPC .............. F05D 2260/98; F05D 2260/84; F05D 2260/40311; F05D 2220/323; F05D 2270/804; F05D 2270/304; F16H 57/0442; F16H 57/0482; F16H 57/0471; F16H 57/045; F16H 57/0439; F16H 57/0435; F16H 57/042
See application file for complete search history.

(56) References Cited

U.S. PATENT DOCUMENTS

| | | | | |
|---|---|---|---|---|
| 5,836,746 A * | 11/1998 | Maruyama | .......... | F04C 29/0085 417/44.1 |
| 6,290,024 B1 * | 9/2001 | Ehlert | .......... | F16N 7/32 184/6.22 |
| 6,481,978 B2 * | 11/2002 | Zamalis | .......... | F01D 21/00 184/6.11 |
| 7,662,059 B2 * | 2/2010 | McCune | .......... | F01D 25/20 475/159 |
| 7,883,438 B2 | 2/2011 | McCune | | |
| 8,215,454 B2 | 7/2012 | Portlock et al. | | |
| 8,230,974 B2 * | 7/2012 | Parnin | .......... | F01D 25/18 184/6.11 |
| 8,702,373 B1 | 4/2014 | Valva et al. | | |
| 8,978,829 B2 * | 3/2015 | McCune | .......... | F17D 3/00 137/1 |
| 9,840,969 B2 * | 12/2017 | Sheridan | .......... | F02C 7/36 |
| 10,145,276 B2 * | 12/2018 | Parnin | .......... | F01M 11/10 |
| 10,196,926 B2 * | 2/2019 | Ketchum | .......... | F01D 21/00 |
| 10,267,233 B2 * | 4/2019 | Mastro | .......... | F01D 25/20 |
| 2006/0223664 A1 * | 10/2006 | Duong | .......... | F16H 57/0479 475/159 |
| 2009/0177433 A1 | 7/2009 | Palmer et al. | | |
| 2010/0023169 A1 | 1/2010 | Delaloye | | |
| 2013/0098059 A1 | 4/2013 | Suciu et al. | | |
| 2013/0195603 A1 | 8/2013 | Sheridan et al. | | |
| 2015/0292359 A1 | 10/2015 | Ketchum et al. | | |
| 2015/0377066 A1 | 12/2015 | Duong et al. | | |
| 2016/0222975 A1 | 8/2016 | Sheridan et al. | | |
| 2016/0290229 A1 | 10/2016 | Sheridan et al. | | |
| 2016/0305284 A1 | 10/2016 | Mastro et al. | | |
| 2016/0376988 A1 | 12/2016 | Sheridan | | |
| 2017/0002738 A1 | 1/2017 | Sheridan | | |
| 2017/0009776 A1 | 1/2017 | Gomanne et al. | | |
| 2017/0114662 A1 | 4/2017 | Mastro | | |
| 2017/0122330 A1 | 5/2017 | Mastro et al. | | |
| 2017/0356452 A1 | 12/2017 | Mastro | | |
| 2018/0045119 A1 | 2/2018 | Sheridan et al. | | |
| 2018/0135741 A1 | 5/2018 | Xu | | |
| 2018/0158261 A1 * | 6/2018 | Ottikkutti | .............. | F01M 11/10 |
| 2018/0202368 A1 | 7/2018 | Suciu et al. | | |
| 2019/0323597 A1 | 10/2019 | Sheridan | | |

FOREIGN PATENT DOCUMENTS

| | | |
|---|---|---|
| EP | 3184780 A1 | 6/2017 |
| EP | 3258086 A1 | 12/2017 |
| WO | 2015/060912 A2 | 7/2014 |
| WO | 2015/147949 A2 | 10/2015 |

OTHER PUBLICATIONS

European Search Report for EP Application No. 19164992.0 dated Jul. 16, 2019.
Letter from the Opponent for European Patent No. 3557000 (19169100.5) mailed Apr. 18, 2023 by Safran Aircraft Engines. [with English translation].
Notice of Opposition for European Patent No. 3557000 (19169100.5) dated Jul. 6, 2022 by Safran Aircraft Engines. [with English translation].
Linke-Diesinger, Andreas. "Systems of Commercial Turbofan Engines", Springer, 2008, pp. 9, 10, 19, 49-55, 89, 108, 109, 122.
The Jet Engine, Rolls-Royce plc, 2005, pp. 190-201.
Giampaolo, Anthony. "Gas Turbine Handbook: Principles and Practices", Third Edition, 2006, pp. 77, 105, 107, 109, 183.
Wikipedia. Proximity Sensor. Retrieved Jul. 5, 2022 from https://en.wikipedia.org/w/index.php?title=Proximity_sensor&oldid=831819644.
Summons to attend oral proceedings pursuant to Rule 115(1) EPC for EP Patent No. 3557000 (19169100.5) dated Nov. 23, 2023.
Letter from the Opponent for European Patent No. 3557000 (19169100.5) mailed Apr. 9, 2024 by Safran Aircraft Engines. [with English translation].
Interlocutory decision in Opposition proceedings for European Patent No. 3557000 (19169100.5) dated Aug. 12, 2024.

* cited by examiner

ELECTRIC MOTOR DRIVEN AUXILIARY OIL SYSTEM FOR GEARED GAS TURBINE ENGINE

BACKGROUND OF THE INVENTION

This application relates to an auxiliary oil system to supplement a main oil supply system on a gas turbine engine with a gear drive for a fan.

Gas turbine engines are known and, typically, include a fan delivering air into a bypass duct as propulsion air and also delivering air into a core engine. The core engine flow passes into a compressor where it is compressed and then delivered into a combustion section. The compressed air is mixed with fuel and ignited in the combustion section and products of this combustion pass downstream over turbine rotors driving them to rotate.

Historically, a turbine rotor drove the fan rotor at a single speed. This led to compromise in the desired speed for both the fan rotor and the turbine rotor. The fan rotor could not rotate unduly fast and, thus, the turbine rotor typically rotated slower than would be desired.

More recently, it has been proposed to include a gear reduction between a fan drive turbine and the fan rotor. This has allowed the fan to rotate at slower speeds and results in many efficiencies.

However, the gear reduction requires adequate lubrication and must be lubricated even under extreme flight conditions.

SUMMARY OF THE INVENTION

In a featured embodiment, a gas turbine engine includes a fan drive turbine, a fan rotor, and a gear reduction driven by the fan drive turbine and, in turn, to drive the fan rotor. A main oil supply system supplies oil to components within the gear reduction, and an auxiliary oil supply system. The auxiliary oil supply system includes a rotation sensor for sensing rotation of a component that will rotate with the fan rotor, a control, an auxiliary oil pump, and a main supply sensor for sensing operation of the main oil supply system. The control is programmed to supply oil from the auxiliary oil pump to the gear reduction when the rotation sensor senses the component is rotating. A determination is made that inadequate oil is being supplied from the main oil supply system based upon information from the main supply sensor.

In another embodiment according to the previous embodiment, the control controls an electric motor for the auxiliary oil pump.

In another embodiment according to any of the previous embodiments, the main supply sensor senses a pressure of the main oil supply system.

In another embodiment according to any of the previous embodiments, the rotation sensor is an optical sensor.

In another embodiment according to any of the previous embodiments, the main supply sensor senses a pressure of the main oil supply system.

In another embodiment according to any of the previous embodiments, the rotation sensor is an optical sensor.

In another embodiment according to any of the previous embodiments, the rotation sensor is an optical sensor.

In another embodiment according to any of the previous embodiments, the gear reduction includes a sun gear connected to the fan drive turbine to drive intermediate gears that engage a ring gear.

In another embodiment according to any of the previous embodiments, the sun gear, the intermediate gears and the ring gear are enclosed in a bearing compartment, to capture oil removed via a scavenge line connected to a main pump scavenge stage.

In another embodiment according to any of the previous embodiments, the gear reduction is surrounded by an oil gutter to scavenge oil and direct it to an auxiliary oil tank.

In another embodiment according to any of the previous embodiments, the auxiliary oil tank has an overflow conduit that allows excess oil to fall to the bottom of the bearing compartment.

In another embodiment according to any of the previous embodiments, the auxiliary oil tank has a tube with holes at a vertically higher location thereon, such that oil may be drawn from the auxiliary oil tank when it is full or under negative gravity conditions.

In another embodiment according to any of the previous embodiments, the auxiliary pump draws oil from a bottom of an oil sump and the bottom of the oil sump is at lower elevation than a line leading from the oil sump to the main pump scavenge stage.

In another embodiment according to any of the previous embodiments, the auxiliary pump also draws oil from the auxiliary oil tank.

In another embodiment according to any of the previous embodiments, the auxiliary oil system is operable to supply lubricant for at least 30 seconds at high power operation of the associated engine should the main oil supply system fail.

In another embodiment according to any of the previous embodiments, the auxiliary oil system being operable to allow the engine to operate under windmill conditions in the air for 90 minutes or longer.

In another embodiment according to any of the previous embodiments, the auxiliary oil system being operable to operate indefinitely on the ground when windmilling with wind speeds below 85 mph or less.

In another embodiment according to any of the previous embodiments, the auxiliary oil system being operable to fly with the engine in an aircraft under negative gravity conditions for at least 20 seconds.

In another embodiment according to any of the previous embodiments, the auxiliary oil system being operable to operate indefinitely on the ground when windmilling with wind speeds below 85 mph or less.

In another embodiment according to any of the previous embodiments, the auxiliary oil system being operable to fly with the engine in an aircraft under negative gravity conditions for at least 20 seconds.

These and other features may be best understood from the following drawings and specification.

DETAILED DESCRIPTION

Figure 1:
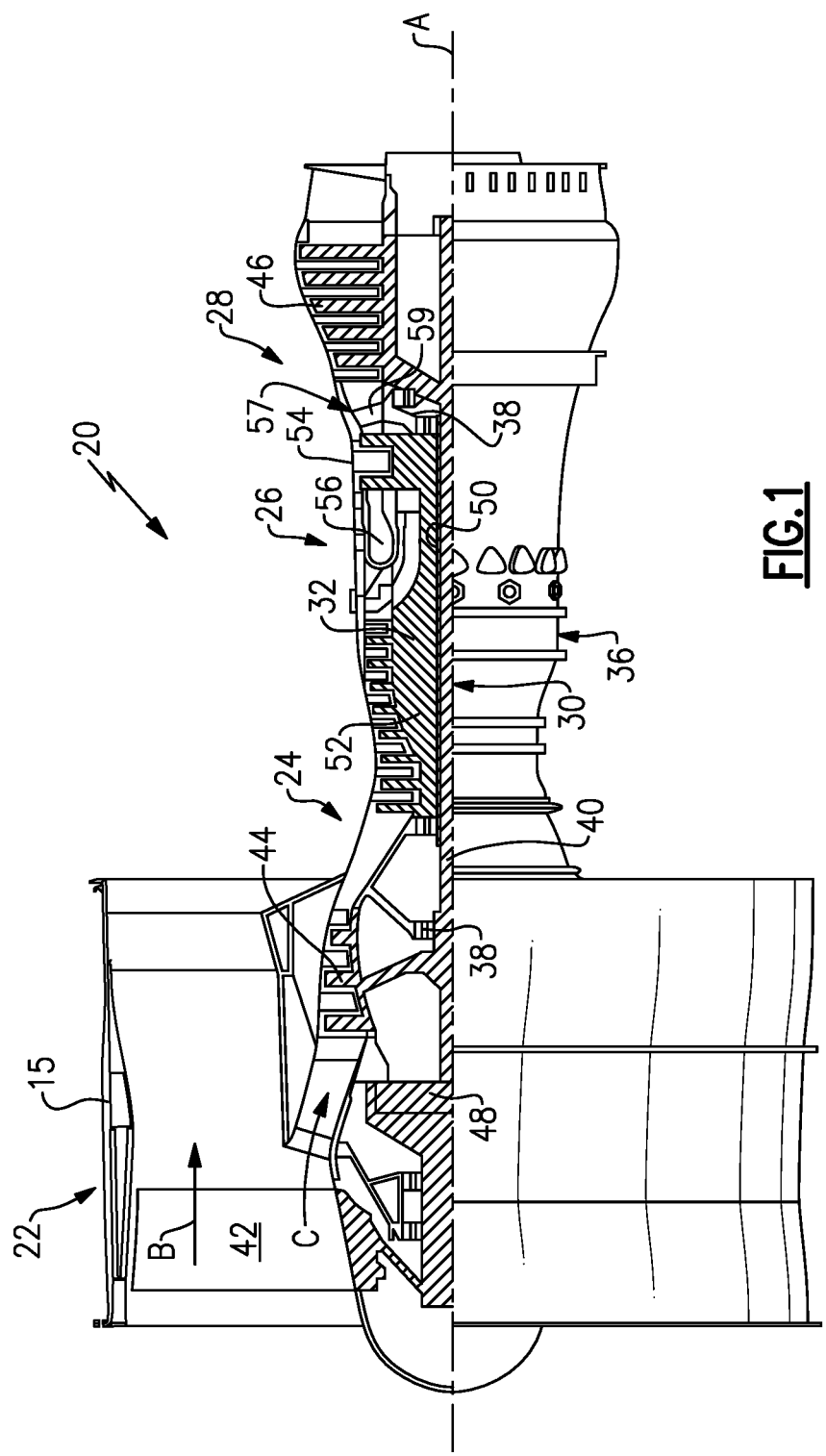
FIG. 1 shows a schematic of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a first (or low) pressure compressor 44 and a first (or low) pressure turbine 46. The inner shaft 40 is connected to a fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second.

Figure 2:
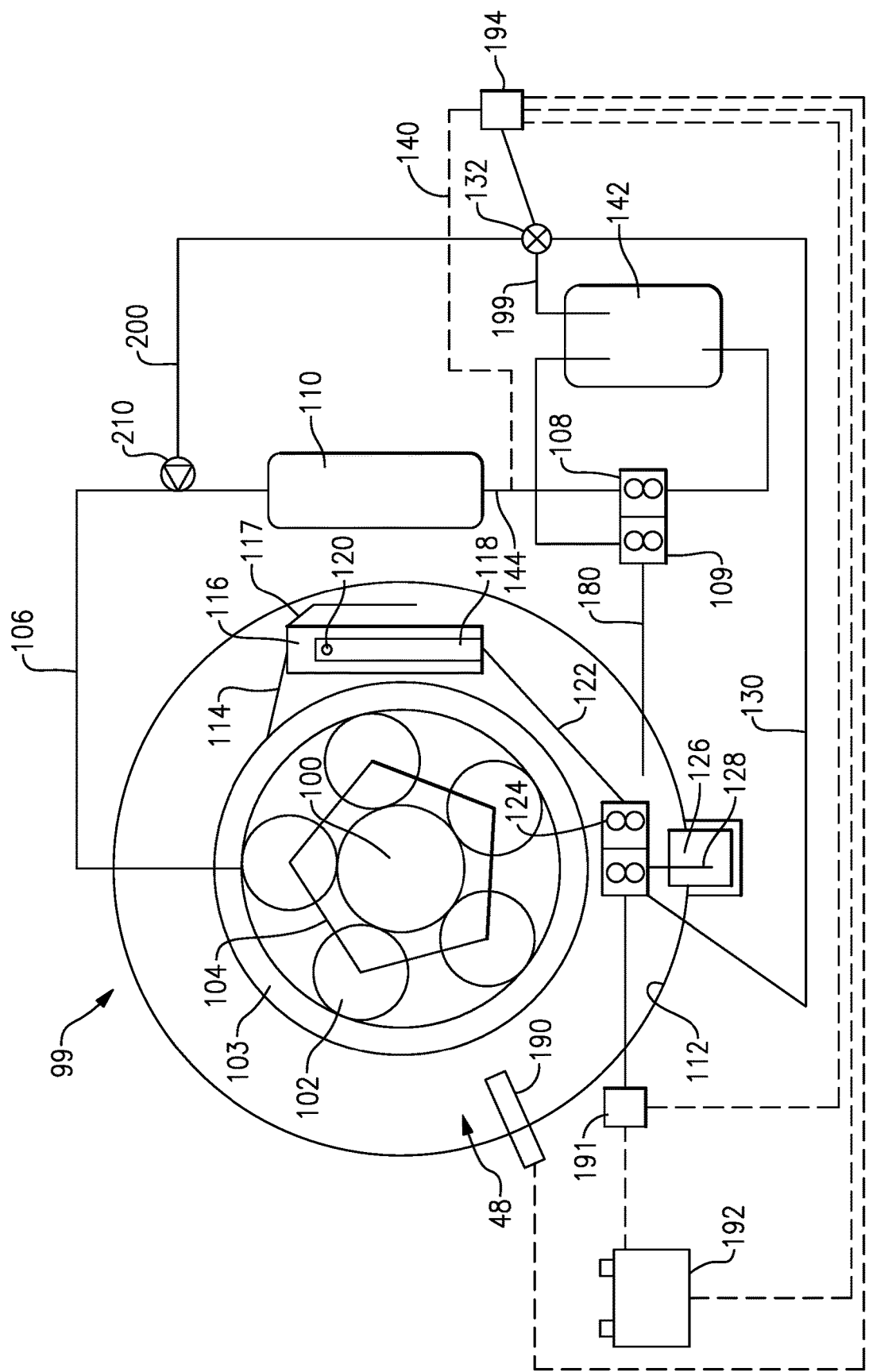
FIG. 2 is a schematic of an oil supply system.

FIG. 2 shows an oil supply system 99 for the gear reduction such as gear reduction 48 in the gas turbine engine 20 of FIG. 1. The gear reduction 48 includes a sun gear 100 which is driven by a fan drive turbine (such as turbine 46 of FIG. 1) and engages a plurality of intermediate gears 102. In some embodiments, the intermediate gears 102 may be planet gears of a planetary epicyclic gear system. In other embodiments, the intermediate gears 102 may be star gears of a star epicyclic gear system. In some embodiments, the intermediate gears 102, in turn, drive a ring gear 103 which drives a fan drive shaft to, in turn, rotate a fan (such as fan rotor 42). Other gear arrangements would come within the scope of this application and the above is merely one example for a gear reduction which may be utilized to drive a fan rotor. For example, in other embodiments, a gear carrier (not shown) driven by intermediate gears may drive the fan shaft.

Oil supply 104 is shown schematically delivering oil to the planet gears 102. It should be understood the oil is supplied to other components such as journal pins, bearings, etc. associated with the gear architecture illustrated in FIG. 2.

A main oil supply system delivers oil to the gear architecture 48. The main oil supply system may include any of a line 106, a main oil supply pump 108, a lubrication system 110 that includes filters, an oil tank 142, and a line 144. Oil is supplied from the line 106 delivered from the main oil supply pump 108. A pressure stage of the main oil supply pump 108 receives oil from the oil tank 142. The oil in the oil tank 142 feeds the main pump 108, directs the oil through the line 144, and is then conditioned in the lubrication system 110 that may contain filters to clean the oil and heat exchangers to cool the oil, as known. The oil then passes back to the gear architecture 48 through the line 106.

A bearing compartment 112 surrounds the gear reduction 48. The bearing compartment 112 has oil removed via a scavenge line 180, which returns the oil to a scavenge side 109 of the main pump 108, which, in turn, delivers the oil back to the oil tank 142.

The gear architecture is surrounded by an oil gutter 114, shown schematically, that scavenges oil from the gear architecture and directs it to an auxiliary tank 116. When tank 116 is full, an overflow conduit 117 allows excess oil to fall to the bottom of the bearing compartment 112. The gutter 114 is at least 70% efficient. This means that up to 30% of the oil falls out of the gutter and is scavenged by the scavenge side 109 of the main pump 108 through line 180. The 70% that is captured in the gutter is directed into the tank 116.

The detail of the oil supply 104, the gutter 114 and the gears generally may be as shown in U.S. Patent Application 2008/0116010, now U.S. Pat. No. 8,215,454, issued Jul. 10, 2012. The details of those features are incorporated herein by reference.

An auxiliary oil pump 124 is shown, which will supply oil to the gear reduction 84 if the main oil supply system is not functioning, for whatever reason, or if the fan is being driven by windmill conditions. As described below, under many flight conditions, the main oil supply system may not be able to supply oil.

Thus, the auxiliary pump 124 is provided with an electric motor 191. A power supply 192 is shown schematically as a battery, however, any source of electrical power on the engine or the associated aircraft may be utilized. A motion sensor 190 senses rotation of a fan, the low spool shaft, or a portion of the gear reduction. If rotation is sensed in either direction, then a determination is made that operation of the auxiliary oil pump 124 may become necessary. The motor 191, motion sensor 190, and power supply 192 all communicate with a control 194. Control 194 also receives a pressure indicative of the operating status of the main oil supply pump 108.

Control 194 may be part of the engine FADEC or may be a standalone controller. In general, the control is programmed such that if rotation is sensed by sensor 190 and the pressure in line 144, measured through sensor 140 is indicative of the main oil pump 108 not providing adequate lubricant flow, then oil is supplied from the auxiliary pump 124, as described below.

An inadequate lubricant flow may be described as oil flow that may result in degradation or loss of function of the gears in the gear reduction or the associated bearings that support the gears. As an example, if control 194 "sees" a pressure 50% below normal from sensor 140 during normal flight, then a determination might be made that inadequate oil is being provided by the main oil supply system. Of course other limits may be set aside from 50%. In an alternative example, if the control 194 sees zero pressure at sensor 140 on ground with rotation sensed by sensor 190, then a determination might be made that the auxiliary oil supply system should supply oil to the gear reduction and the associated bearings. Sensors other than a pressure sensor may be utilized to sense the operation of the main oil supply system.

The term "determination" should be interpreted broadly. As an example, the sensor 140 could be a pressure responsive switch that sends an activation signal to the control should the pressure drop below a minimum. The control, upon receiving such a signal, is programmed to actuate the auxiliary oil supply system.

Broadly, all of these examples are "information" from the sensor supplied to the control.

The pump 124 draws oil from a sump 126 at a bottom of the compartment 112 through a line 128. The sump 126 is at a lower elevation than the main scavenge line 180 and also draws oil from the tank 116 through the line 122. Sump 126 will trap any residual oil in the bearing compartment 112.

There are challenges with the auxiliary pump with regard to negative gravity conditions. Further, if there is a break in the main oil supply system or windmilling of the engine when the engine is otherwise shut down, it is desirable for the engine to be able to maintain operation for at least 30 seconds at power without damage if the main oil supply (108/106, etc.) ruptures or otherwise fails. This will provide a pilot time to shut the engine down.

It is also desirable to allow the engine to windmill in the air for 90 minutes or more without damage if it is shut down for other reasons than oil system failure. It is also desirable to allow the engine to windmill indefinitely, and at least twenty-four hours, on the ground with wind speeds above 10 mph and below about 85 mph. As known, windmilling refers to a condition where the engine is shut down, however, air being forced into the fan rotates the fan, in turn, causing components to rotate.

Also, it is desirable to allow an aircraft to fly under negative gravity conditions for at least 20 seconds.

All of these raise challenges with regard to operating the engine and supplying oil to the gear components.

The arrangement of the components, as described above, allow these conditions to be met.

The auxiliary pump 124 draws oil from the sump 126. Pump 124 also draws oil from a line 122. The tank 116 has a tube 118 with holes 120, the tank 116 positioned at a vertically higher location relative to the auxiliary pomp 124. The holes 120 are configured such that oil is only drawn from the tank 116 to the line 122 when it is full or under negative gravity conditions. Otherwise, oil is drained from the tank 116 by overflow through the conduit 117.

Should the control determine that the pressure at line 144, measured by sensor 140 is indicative of the main oil supply pump 108 not providing adequate lubricant, and the motion sensor 190 senses rotation of the engine, the valve 132 is opened to deliver oil from the auxiliary oil pump 124 to line 200 and then to line 106, and feed the gear reduction to ensure that the conditions as described in this application are met. Line 200 is equipped with a one way check valve 210, such that oil will only flow from line 200 to line 106. In the event of rupture or malfunction of tank 142, pump 108 or lubrication system 110, oil will always be directed to the gear reduction and not spill out through a ruptured component.

In embodiments, the sensor 190 may be an optical sensor or any other rotation sensing system.

The conditions as described above are met in large part, since the auxiliary oil tank 116, and the tube 118, has the holes 120 only at the top, such that oil is only drawn from the tank 116, through the line 122 when it is full, or under negative G conditions. Further, since the sump 126 is at a lower elevation than a main scavenge line 180, the auxiliary pump 124 will always be supplied with oil, in both positive and negative G conditions. Further, the auxiliary pump 124, in combination with the valve 132, ensure that oil will be supplied in adequate amounts during the conditions set forth above.

Words such as "top" or "lower elevation" or anything relating to relative vertical positions should be understood to be taken relative to the positions the engine components will occupy when an aircraft associated with the gas turbine engine is on the ground.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A gas turbine engine comprising:
a fan drive turbine, a fan rotor, and a gear reduction driven by said fan drive turbine and, in turn, to drive said fan rotor, a main oil supply system for supplying oil to components within said gear reduction, and an auxiliary oil supply system; and said auxiliary oil supply system including a rotation sensor for sensing rotation of a component that will rotate with said fan rotor, a control, an auxiliary oil pump with an electric motor drive, and a main supply sensor for sensing operation of said main oil supply system, said control being programmed to actuate said electric motor for said auxiliary oil pump such that it supplies oil to the gear reduction when the rotation sensor senses the component is rotating, and a determination is made that inadequate oil is being supplied from said main oil supply system based upon information from said main supply sensor;

said gear reduction is surrounded by an oil gutter to scavenge oil and direct it to an auxiliary oil tank;

said auxiliary oil tank has an overflow conduit that allows excess oil to fall to the bottom of said bearing compartment;

wherein said auxiliary oil tank is positioned at a vertically higher location relative to the auxiliary oil pump;

said auxiliary oil tank has a tube with holes, and the holes are positioned at a location such that oil may be drawn from said auxiliary oil tank when it is full or under negative gravity conditions, said tube connected through a first fluid connection to the auxiliary oil pump, and the overflow conduit being separate from the first fluid connection, said auxiliary oil pump also receiving oil from a sump through a second fluid connection;

wherein said auxiliary oil system is operable to supply lubricant for at least 30 seconds at high power operation of the associated engine should the main oil supply system fail;

wherein said auxiliary oil system being operable to allow the engine to operate under windmill conditions in the air for 90 minutes or longer;

wherein said auxiliary oil system being operable to operate indefinitely on the ground when windmilling with wind speeds below 85 mph; and wherein said auxiliary oil system being operable to fly with the engine in an aircraft under negative gravity conditions for at least 20 seconds.

2. A gas turbine engine comprising:

a fan drive turbine, a fan rotor, and a gear reduction driven by said fan drive turbine and, in turn, to drive said fan rotor, a main oil supply system for supplying oil to components within said gear reduction, and an auxiliary oil supply system; and said auxiliary oil supply system including a rotation sensor for sensing rotation of a component that will rotate with said fan rotor, a control, an auxiliary oil pump with an electric motor drive, and a main supply sensor for sensing operation of said main oil supply system, said control being programmed to actuate said electric motor for said auxiliary oil pump such that it supplies oil to the gear reduction when the rotation sensor senses the component is rotating, and a determination is made that inadequate oil is being supplied from said main oil supply system based upon information from said main supply sensor;

said gear reduction is surrounded by an oil gutter to scavenge oil and direct it to an auxiliary oil tank;

said auxiliary oil tank has an overflow conduit that allows excess oil to fall to the bottom of said bearing compartment;

wherein said auxiliary oil tank is positioned at a vertically higher location relative to the auxiliary oil pump; and said auxiliary oil tank has a tube with holes, and the holes are positioned at a location such that oil may be drawn from said auxiliary oil tank when it is full or under negative gravity conditions, said tube connected through a first fluid connection to the auxiliary oil pump, and the overflow conduit being separate from the first fluid connection, said auxiliary oil pump also receiving oil from a sump through a second fluid connection.

* * * * *